United States Patent Office 3,827,927

Patented Aug. 6, 1974

3,827,927

METHOD OF BONDING USING IMPROVED POLYIMIDE ADHESIVES

Hyman R. Lubowitz, Hawthorne, Calif., assignor to TRW Inc., Redondo Beach, Calif.

No Drawing. Filed Dec. 30, 1971, Ser. No. 214,432
Int. Cl. C09j 5/00; B32b 27/34
U.S. Cl. 156—331 5 Claims

ABSTRACT OF THE DISCLOSURE

High temperature adhesives are formed by pyrolytically polymerizing compounds of the general formula

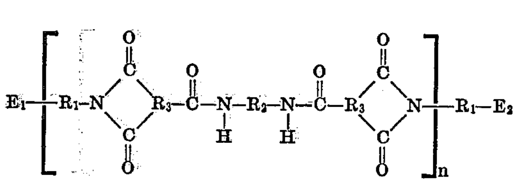

where: $E_1$ and $E_2$ are individually selected from the class consisting of

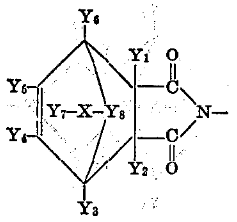

and

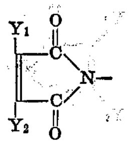

where: X is a member of the class consisting of carbon, oxygen, sulfur, and carbonyl $Y_1$–$Y_6$; and $Y_7$ and $Y_8$ when present, are individually selected from the class consisting of hydrogen, aromatic groups, substituted aromatic groups, saturated or unsaturated hydrocarbon groups having from 1 to 6 carbon atoms, alkyl ethers, aryl ethers, halogens, and nitro groups;

$R_1$ and $R_2$ are individually selected from the class consisting of aromatic groups, substituted aromatic groups, saturated and unsaturated hydrocarbon groups, saturated and unsaturated heterocyclic groups, and mixtures thereof;

$R_3$ is selected from the class consisting of substituted aromatic groups, unsubstituted aromatic groups, saturated cyclic groups, unsaturated cyclic groups, saturated heterocyclic groups, and unsaturated heterocyclic groups, and

*n* is one or more for a single prepolymer and statistically greater than 0 for a mixture.

The adhesives may also be formed by pyrolytically polymerizing the novel amic-acid precursors of said prepolymers which are characterized by the formula

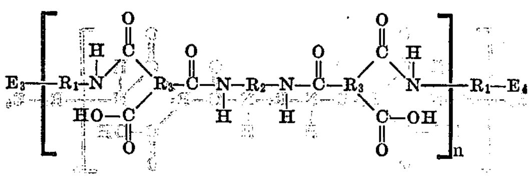

2 where: $E_3$ and $E_4$ are individually selected from the class consisting of

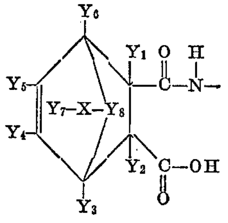

and

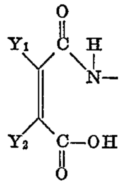

where:

$X_1$, $Y_1$–$Y_6$ and $Y_7$ and $Y_8$ are defined as defined above; and $R_1$, $R_2$, and $R_3$ and *n* are as described above.

CROSS-REFERENCES TO RELATED APPLICATIONS

This application is related to the following applications by the same inventor filed concurrently herewith: Polyamide-Imides, Prepolymers and Precursors Thereof, Ser. No. 214,416, now Pat. No. 3,781,249; Improved Polyimide Coatings, Ser. No. 214,439, now abandoned; Improved Polyimide Laminates and Composites, Ser. No. 214,433; and, Improved Polyimide Molding Powders, Ser. No. 214,417, now Pat. No. 3,781,240, all filed on Dec. 30, 1971.

BACKGROUND OF THE INVENTION

(A) Field of the Invention

This invention relates in general to the field of synthetic polymeric resins. More particularly, it relates to improvements in polyamide-imide polymerizates, useful products made therefrom, their prepolymers, precursors, and their manner of preparation. Still further, this invention relates to rapid curing, stable, high molecular weight polyamide-imides formed by pyrolytically polymerizing polyamide-imide prepolymers and polyamic-acid precursors.

(B) Description of the Prior Art

The need for synthetic materials capable of maintaining their properties at elevated temperatures and under exposure to a wide variety of chemical environments has accelerated in recent years. In general the search for such materials has focused on synthetic polymer resin systems. Initially two resin systems—phenolic and silicone, were widely employed. Although those systems possess several important qualities, they have not yielded the combination of physical, chemical, and thermal properties required for many contemporary uses.

As a result, an increasing amount of attention has been directed to polyimides and polyamide-imides. These polymers are generally recognized for their outstanding physical and chemical properties. Presently, polyimides are being marketed as varnishes, coatings for glass fabrics, insulating enamels, self-supporting films, laminating resins, and molded products such as bearings, piston rings, etc., where the resin must function at temperatures and under conditions where most other known materials have failed.

However, while presently available polyimides are known to have outstanding physical and chemical properties, which makes them attractive for many applications, the problems encountered in processing and in preparing these polyimides have limited their full potential use. Generally, for example, these polyimides are obtained by synthesizing high-molecular weight or long-chain precursor polymers. The precursors are converted to the desired heterocyclic ring polymers by completely imidizing or condensing them, thereby yielding high molecular weight polyimides. However, because these polyimides are almost impervious to solvents, they are now being marketed as a varnish for making prepregs for glass laminates, etc., in the precursor form. The precursor of polyamide-acids, obtained by linear chain extension or polymerization, is substantially unstable at ambient temperatures and therefore must be kept in solution hermetically sealed and refrigerated to avoid hydrolytic and oxidative degradation. Ultimately, the polyamide-acid precursors substantially free of solvent are cured by the application of heat for periods ranging up to about 16 hours at substantially elevated temperatures to produce the completely imidized product. This reaction is accompanied by the evolution of an appreciable amount of volatile matter, e.g., residual solvent, water, etc., thus tending to produce voids, for example, in laminated structures.

A significant advance in the field of high performance polyimides is represented by U.S. Pat. 3,528,950 to Hyman R. Lubowitz. In accordance with the teachings of that patent, rapid-curing, stable polyimides are prepared by heating polyimide prepolymers formed by coreacting end-capping, specific monoanhydrides with mixture of dianhydrides and diamines. The end-capping anhydrides are compounds having the structural formula:

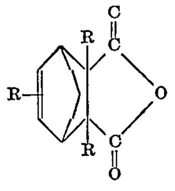

where R represents hydrogen or a lower alkyl.

Where as the prepolymers and pyrolytically polymerized final polymers described in that patent possess outstanding properties not found in other polyimide polymer systems, certain drawbacks of these polymers have been identified. For example, in general, those prepolymers are not readily soluble in organic solvents. As a result it is necessary to employ solutions of the precursors of the prepolymers in the preparation of the final products. Unfortunately, these precursors are unstable with respect to heat and moisture and thus require special precautions in storage and use.

On the other hand, soluble prepolymers are desirable because they can be sold as such and can be transported and stored under atmospheric conditions. They also can be prepared in solution, on-site as the need arises. Since in many cases on-site preparation is a requirement, prepolymers which can be easily transported possess substantial economic advantages.

The utility of the polymers disclosed in U.S. Pat. 3,528,950 is also somewhat limited by their expense due primarily to the high cost of the aromatic dianhydrides employed. Because of their expense those polymers are limited to only those high-priced applications where very high performance is required such as in the aircraft and aerospace industries.

Another limitation on the use of those polymers is presented by difficulties encountered during resin processing. In most instances these difficulties are traceable to poor flow characteristics. In certain applications, good flow characteristics are very important. For example, in fabrication of laminates using autoclave or vacuum bag techniques, the required wetting of the fibers is greatly facilitated if the resin has good flow. Previously, it has been necessary to augment flow by maintaining an amount of residual solvent in the resin during fabrication. The benefits of this practice, however, are often offset by the tendency of the solvent to volatilize and cause voids in the cured resin structure.

As a result of the deficiencies of prior art resin systems, there remains in the art a need for an improved polymer resin system which is less expensive and exhibits improved flow characteristics while retaining high performance characteristics at elevated temperatures and during exposure to a wide variety of chemical environments.

SUMMARY OF THE INVENTION

Briefly, the preferred embodiments of the present invention present improved adhesives prepared by pyrolytically polymerizing novel polyamide-imide polymers represented by the formula:

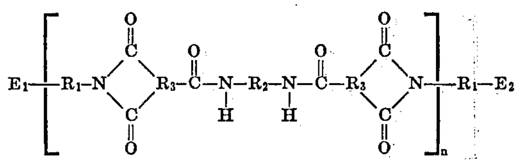

where: $E_1$ and $E_2$ are individually selected from the class consisting of

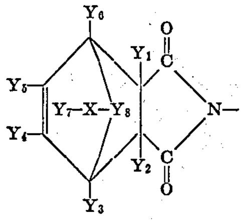

and

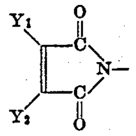

where:

- X is a member of the class consisting of carbon, oxygen, sulfur, and carbonyl; $Y_1$–$Y_6$; and $Y_7$ and $Y_8$ when present, are individually selected from the class consisting of hydrogen, aromatic groups, substituted aromatic groups, saturated or unsaturated hydrocarbon groups having from 1 to 6 carbon atoms, alkyl ethers, aryl ethers, halogens, and nitro groups.
- $R_1$ and $R_2$ are individually selected from the class consisting of aromatic groups, substituted aromatic groups, saturated and unsaturated hydrocarbon groups, saturated and unsaturated heterocyclic groups, and mixtures thereof.
- $R_3$ is selected from the class consisting of substituted aromatic groups, unsubstituted aromatic groups, saturated cyclic groups, unsaturated cyclic groups, saturated heterocyclic groups and unsaturated heterocyclic groups; and
- $n$ is one or more for a single prepolymer and statistically greater than 0 for a mixture of prepolymers.

The adhesives may also be formed by pyrolytically polymerizing the novel amic-acid precursors of said prepolymers which are characterized by the formula

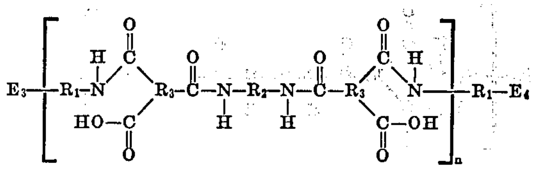

where: $E_3$ and $E_4$ are individually selected from the class consisting of

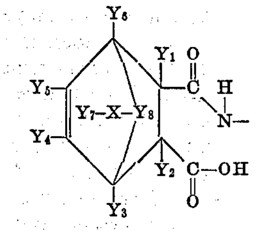

and

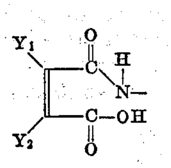

where:

$X_1$, $Y_1$–$Y_6$ and $Y_7$ and $Y_8$ are as defined above; and $R_1$, $R_2$, $R_3$ and N are as defined above.

The pyrolytically polymerized prepolymer is useful as an adhesive, molding composition, coating, or as a matrix material in the preparation of high strength laminates and composites.

These prepolymers and the precursors thereof are generally soluble in polar solvents. Polymers formed therefrom exhibit improved processability particularly with regard to flow characteristics. They are also less expensive than prior art polymers and in addition exhibit unexpectedly good adhesive properties.

Accordingly, the objects of this invention are:

to provide an improved polymeric resin system;

to provide improved polyimide products;

to provide an improved polyimide adhesive; and to provide improved processes for the preparation of polyimide adhesives.

These and other objects and advantages of the invention will become more apparent to those of ordinary skill in the art upon consideration of the following description of the preferred embodiments of the invention which includes a description of the best mode of carrying out the invention as presently perceived.

DESCRIPTION OF THE PREFERRED EMBODIMENTS

The preferred embodiments of this invention pertain to the preparation of adhesives from novel polyimide prepolymers and precursors of said prepolymers.

Prepolymers

Prepolymers prepared herein relate to a class of polymers represented by the general formula:

$$E_1—B—E_2$$

where: B represents a backbone composition; and $E_1$ and $E_2$ represent end groupings individually selected from the class consisting of

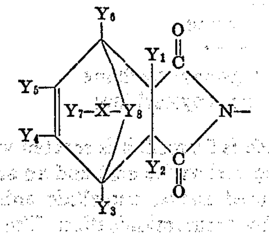

and

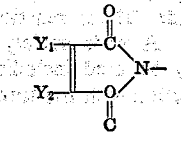

where:

X is a member of the class consisting of carbon, oxygen, sulfur, and carbonyl; and $Y_1$–$Y_6$, and $Y_7$ and $Y_8$, when present, are individually selected from the class consisting of hydrogen, aromatic groups, substituted aromatic groups, saturated or unsaturated hydrocarbon groups having from 1 to 6 carbon atoms, alkyl ethers, aryl ethers, halogens, and nitro groups.

In U.S. Pat. 3,528,950, the backbone composition was selected from the group of compounds represented by the formula:

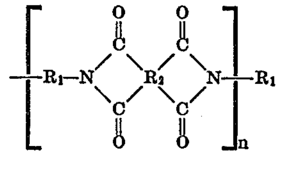

where $R_1$ represents an aliphatic or aromatic group.

As noted above, final polymers made in accordance with that patent represented a substantial advance in the art.

In the present invention, the backbone units correspond to the general formula

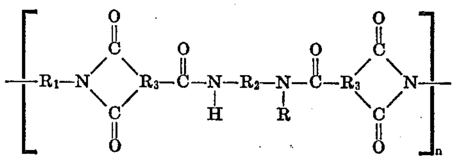

where:

$R_1$ and $R_2$ are individually selected from the class consisting of aromatic groups, substituted aromatic groups, saturated and unsaturated hydrocarbon groups, saturated and unsaturated heterocyclic groups and mixtures thereof.

$R_3$ is selected from the class consisting of substituted aromatic groups, unsubstituted aromatic groups, saturated cyclic groups, unsaturated cyclic groups, saturated heterocyclic groups and unsaturated heterocyclic groups; and $n$ is one or more for a single prepolymer or statistically greater than 0 for a mixture of prepolymers.

As a result, the prepolymers can be represented by the formula

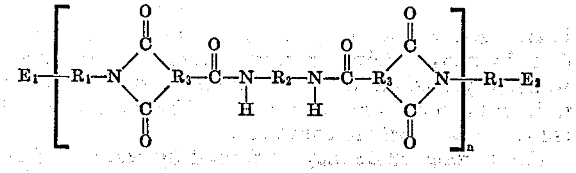

It is also contemplated that useful prepolymers can be formed by mixing these compounds with compounds of the general formula $$E_1—R_1—E_2$$

where $E_1$, $E_2$, and $R_1$ are defined as above.

The result is that $n$ in the general formula for a mixture of prepolymers may statistically range upwards from an amount greater than 0, although $n$ is preferably less than about 10 for single prepolymers or in mixtures.

The more preferred prepolymers are those which have 80 to 100 percent of their end groups represented by the formula

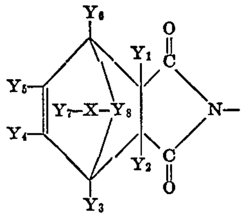

Furthermore, it is preferred that X in this end grouping is carbon and that Y–$Y_8$ is a member of the class consisting of hydrogen, lower alkyl groups, halogen, and mixtures thereof. Examples of lower alkyl groups which are suitable include methyl, ethyl, propyl, butyl, and amyl. It is preferred that $R_1$ and $R_2$ be radicals selected from the class of radicals consisting of aryl, alkyl, cycloalkyl, aralkyl, alkaryl, alkylene, arylene, substituted aryl, substituted alkyl, heterocyclic aryl, substituted arakyl and mixtures thereof. Although hydrocarbon groups are the preferred species for $R_1$, $R_2$ many other groups may also be used. Among the other useful groups are: ethers, mercaptans, aminos, sulfides, sulfoxides, and sulfones.

By far the preferred species for $R_3$ is a phenylene group. The reason being that of the reactants which result in the formation of $R_3$ groups, the most readily available and most economic is trimellitic anhydride. Trimellitic anhydride is a by-product from conventional petroleum cracking processes and is very well suited as a reactant in the formation of the compounds of this invention. However, other groups fitting the above definition of $R_3$ are also contemplated.

When trimellitic anhydride is used as a reactant the backbone of the prepolymer will correspond to the formula:

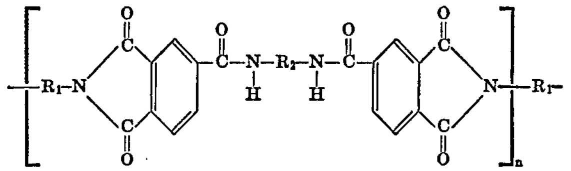

The backbone of the corresponding precursor is represented by:

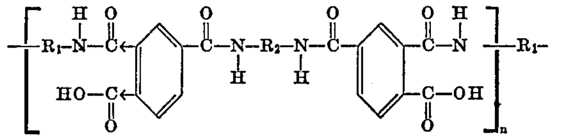

The arrows indicate both isomer forms are possible.

The preferred manner of preparing the prepolymers and precursors of this invention involves the general steps of reacting an amide with an aromatic group containing carboxylic acid and an anhydride group to form a dianhydride by transamidification; then reacting the dianhydride with a polyfunctional amine and an end-capping anhydride to form the prepolymer or precursor. The most preferred anhydride is trimellitic anhydride.

The starting amide may be formed by reaction of an anhydride with a polyfunctional primary amine. A wide variety of anhydrides may be used for this purpose because the acid portion is removed upon a transamidification. In general, the preferred anhydrides are those characterized by the general formula:

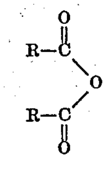

where R is a lower alkyl radical having from 1 to 5 carbon atoms.

It is normally desirable to use an anhydride which, on its reaction with the amine and upon transamidification, forms an acid by-product that is easily removed from solution by conventional means. For example, if acetic anhydride is used, acetic acid is formed which can be readily removed from solution by volatilization and recovered.

Any combination of anhydrides and polyfunctional primary amines known to form an amide reaction product is suitable for use in the present invention. Diamines, triamines, and tetraamines are preferred with diamines being the most preferred of the polyfunctional amines.

The following list is representative of a few of the polyfunctional primary amines which may be used:

para-phenylene diamine
meta-phenylene diamine
4,4'-diamino-diphenyl propane
4,4'-diamino-diphenyl methane
benzidine
4,4'-diamino-diphenyl sulfide
4,4'-diamino-diphenyl sulfone
3,3'-diamino-diphenyl sulfone
4,4'-diamino-diphenyl ether
1,5-diamino-naphthalene
3,3'-dimethoxy benzidine
2,4-bis(beta-amino-t-butyl) toluene
bis-(para-beta-amino-t-butyl-phenyl) ether
bis-(para-beta-methyl-delta-amino-pentyl) benzene
bis-para-(1,1-dimethyl-5-amino-pentyl) benzene
1-isopropyl-2,4-metaphenylene diamine
m-xylene diamine
hexamethylene diamine
heptamethylene diamine
octamethylene diamine
nonamethylene diamine
decamethylene diamine
diamino-propyl tetramethylene diamine
3-methylheptamethylene diamine
4,4-dimethylheptamethylene diamine
2,11-diamino-dodecane
1,2-bis-(3-amino-propoxy) ethane
2,2-dimethyl propylene diamine
3-methoxy-hexamethylene diamine
3,3'-dimethyl benzidine
2,5-dimethylhexamethylene diamine
2,5-dimethylheptamethylene diamine
5-methyl-nonamethylene diamine
2,17-diamino-cicosadecane
1,4-diamino-cyclohexane
1,10-diamino-1,10-dimethyl decane
1,12-diamino-octadecane.

Triamines such as 1,3,5-triaminobenzene
2,4,6-triamino-s-triazine
1,2,3-triaminopropane
4,4',4''-triaminotriphenyl methane
4,4',4''-triaminotriphenylcarbinol Once the amide is formed, it is reacted with an aromatic group containing carboxylic acid and an anhydride group, preferably as noted above, trimellitic anhydride to form a dianhydride by transamidification. The dianhydride is then reacted with a polyfunctional primary amine and an end-capping anhydride. These reactions may occur together or separately. A wide variety of polyfunctional primary amines may be used including all those previously listed in connection with the formation of the starting amide.

The end-capping anhydrides which may be used are selected from those represented by:

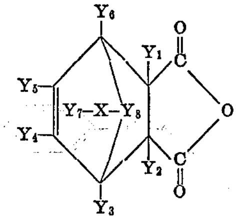

and

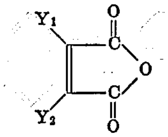

The first listed formula represents the preferred end group. Mixtures of the two end groups are also preferred and if desired the end group represented by the second listed formula may be used by itself, not with the equivalent superior results obtained by the use of end groups corresponding to the first listed formula.

The amount of end-group anhydride used in this reaction is preferably controlled so that $n$ is an integer of from 1 to about 10. This amount of anhydride will produce prepolymers having a molecular weight of from about 500 to 6000.

As a first alternative, the end-capping anhydride may be reacted after reaction of the anhydride product and the polyfunctional amine.

The first listed formula may also be formed in situ as a reaction product where it will then react with the backbone polymer to form the ultimate prepolymer structure. One way of forming the anhydride in situ is to react an appropriate anhydride and a conjugated cyclodiene. For example, maleic anhydride and cyclopentadiene can be reacted to form the endomethylene end groups.

Mixtures of the two end groups can also be formed in this manner by adding less than the equivalent amount of cyclopentadiene.

The several reactions involved in the preparation of prepolymers are preferably carried out in one or more solvent mediums. In general, strong polar organic solvents are preferred.

Examples of these solvents are tetramethylurea; dimethylsulfoxide; 1-methyl-2-pyrrolidone; pyridine; dimethylsulfone; hexamethylphosphoramide; N,N - dimethylformamide; N,N-dimethyl acetamide; tetramethylenesulfone; dimethyltetramethylenesulfone; and in general, any polar organic solvent which does not react with the polyfunctional amines or polyfunctional anhydrides at the process conditions. Nonpolar solvents such as toluene may be employed in small amounts in conjunction with the above polar solvents as an aid in entraining the prepolymer reaction by-products, principally water from the reaction site, thereby forming the prepolymer in solution. The resulting solutions as such may be employed as varnishes, for example, in the preparation of prepregs for laminates. If desired, the prepolymers can be prepared in the absence of a solvent media by reaction in a melt form.

A significant advantage of the present invention lies in the fact that the prepolymers are stable and soluble in highly polar organic solvents. This allows the prepolymers to be shipped and stored as such or in solution under atmospheric conditions for latter use.

Preparation of Prepolymer Precursors

Amic acid precursors corresponding to the prepolymers described above can be prepared by carrying out the prepolymer formation reactions at temperatures below about 125° C. These amic acid precursors are compounds represented by the formula

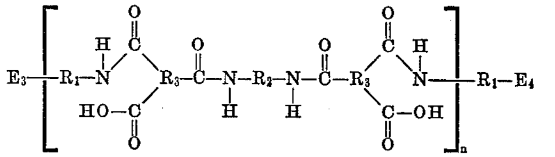

where: $E_3$ and $E_4$ are individually selected from the class consisting of

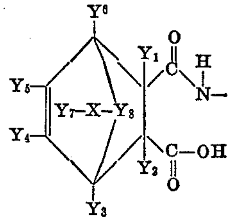

and

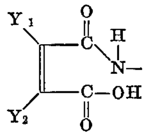

where: $X_1$, $Y_1$–$Y_8$ are as defined; and $R_1$, $R_2$, $R_3$, and $n$ are as hereinabove defined.

Mixtures of precursors and the previously described prepolymers are formed if the reaction temperautres are between about 125° C. and 200° C. with the percentage of prepolymer increasing at increasing temperatures within this range. At temperatures above 200° C. the precursors will be condensed and imidized to the corresponding prepolymer.

The precursors and prepolymers separately or mixed are valuable products in and of themselves. Similarly, solutions of these compounds are valuable. They can be shipped and stored without extraordinary precaution.

Preparation of Final Polymers

Cross-linked polymers, resistant to elevated temperatures and oxidation resistant may be formed without catalysts or coreactive compositions of matter by thermally polymerizing the prepolymers prepared according to this invention.

Polymerization takes place by heating the prepolymer or the precursors of prepolymers to a temperature of from about 225° C. to about 375° C. for a period of time of about 5 minutes to about 2 hours, depending upon the prepolymer or precursor used. If the prepolymer is in solution it is preferable to drive the solvent prior to final curing of the prepolymer. Although the reactions by which the final resins are obtained are not known, it is theorized that the end groups of the polyamide-imide prepolymer molecular chain become reactive at temperatures above 160° C. The result is a coreaction between the end groups linking the prepolymers together to form macromolecules having a molecular weight of about 10,000 or above. These polymers are rapid-curing and stable in high thermal and oxidative environments. For example, polymers prepared in this manner exhibit long term thermal stability at temperatures greater than 500° F.

Due to their superior properties these polymers find utility in a wide variety of applications demanding high performance materials. Uses include adhesives, laminates, composites, coatings, plastic structures and moldings.

Preparation and Use of Adhesives

The polymers of the present invention may be used to form excellent high temperature adhesive compositions. They can be used with a wide variety of adherents using conventional processing techniques.

The prepolymers, for example, may be applied to different surfaces or adherends by coating them with said prepolymers, precursors of said prepolymers or mixtures thereof, in the form of a melt, slurry, or varnish and subsequently applying heat and pressure; thereby causing the prepolymers to polymerize to a higher molecular weight infusible polymeric bond. More specifically, simultaneously with the thermal polymerization and volatilization of the solvent, the adherends are pressed together at pressures ranging up to about 1,000 p.s.i., e.g., ranging preferably from about 200 to 800 p.s.i. at temperatures ranging from about 175° C. to 350° C. or higher to form the plastic bond. The joints obtained under these conditions may either be in the neat form or they may be reinforced with various materials including glass fibers, silicon, graphite, or some other known filler by initially adding the material to the prepolymer prior to forming the adhesive bond. Since the polyimides of this invention adhere to a variety of materials including, for example, metals, nonmetals, ceramics, synthetics, etc., they may be utilized in a number of areas to obtain thermally stable joints.

An important feature of this invention as it relates to the preparation and use of adhesives is the solubility and stability of the prepolymers. These prepolymers can be stored and shipped without the extraordinary precautions heretofore required by polyimide adhesives. Using the prepolymers of this invention, various adherents, e.g., metal etc., may be coated with the polyimide prepolymers and then stored for substantial periods without employing elaborate precautions. The solubility and stability of the prepolymers allow subsequent polymerization bonding.

The coated adherents may be joined together employing moderate pressures at elevated temperatures. The preferred temperature range is from about 225° to about 375° C. plus or minus 20° C. The pressures applied to create an adherent bond at these temperatures range from less than atmospheric up to about 1000 p.s.i.

Description of the Best Mode for Carrying Out the Invention

The best mode of making prepolymers, precursors thereof, and final pyrolytically polymerized polyamide-imide resins as presently contemplated is described hereinbelow with reference to the formation of specific prepolymers, precursors and polyamide-imide resins.

EXAMPLE I

To begin the preparation, p-phenylene diamine, an aromatic compound bearing two amino groups is reacted with acetic anhydride to form the following compound:

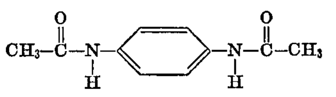

This compound is then reacted with two mole equivalents of trimellitic anyhdride to form the following dianhydride compound:

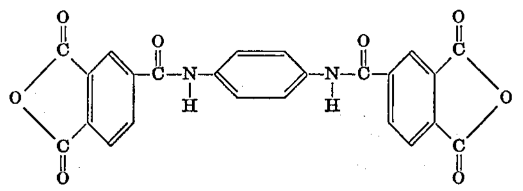

Methylenedianiline is reacted with this compound and 3,6-endomethylene-1,2,3,6-tetrahydrophthalic anhydride, (nadic anhydride) all components being at equivalence. When these reactions take place at temperatures above about 200° C., the following prepolymer compound is formed:

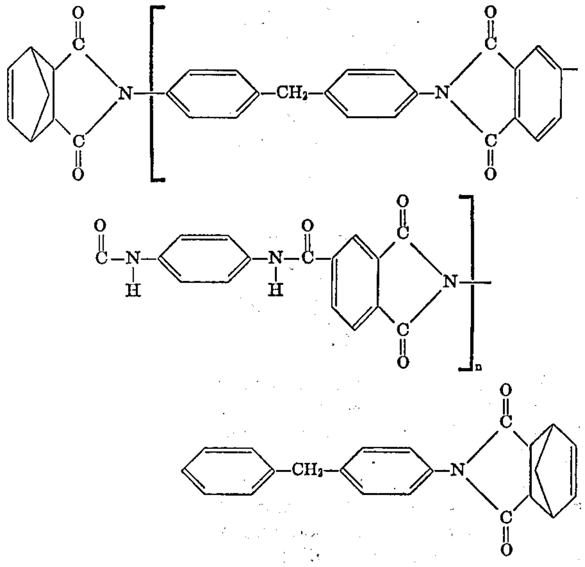

This compound may be recorded by applying heat or vacuum to the solution to effect solvent removal.

At temperatures below about 200° C., the following corresponding amic acid precursor compound is formed:

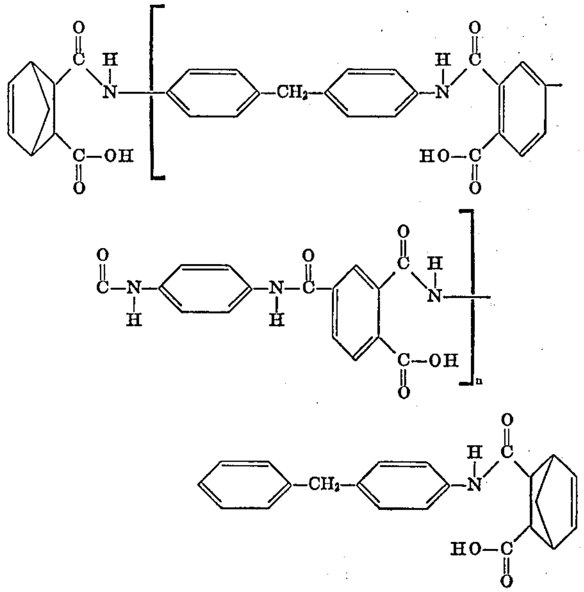

This compound may also be recovered by solvent removal, to prevent imidization, the removal temperature must not exceed about 200° C.

Either of these compounds can be converted by thermal polymerization into a final polyamide-imide resin by heating at 275° C. for 30 minutes or more. The resulting product is a hard material capable of withstanding temperatures of up to about 250° C. without degradation for appreciable periods of time.

EXAMPLE II

Hexamethylene diamine and acetic anhydride are reacted under conventional conditions to yield the following compound:

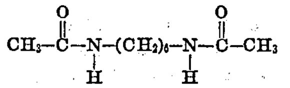

This compound is then reacted with two mole equivalents of trimellitic anhydride to form the following dianhydride compound:

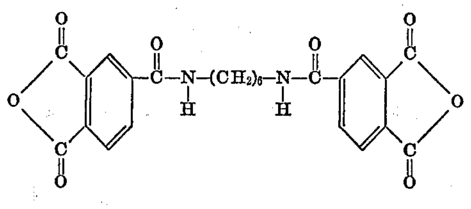

This dianhydride is then reacted with ethylene diamine and nadic anhydride; all reactants being at equivalence. When this reaction is carried out above about 200° C., the following prepolymer compound is formed:

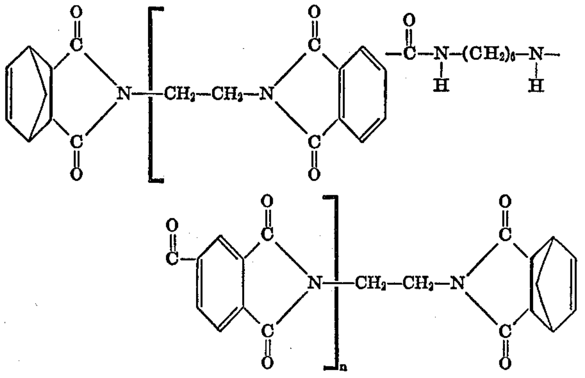

This compound may be recorded by applying heat or vacuum to effect solvent removal.

At temperatures below about 200° C., the following corresponding amic acid precursor compound is formed:

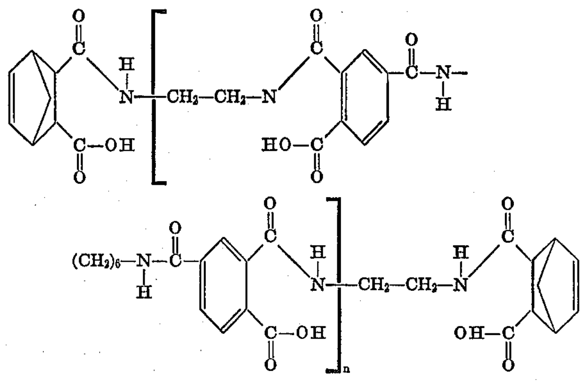

This compound may be recovered as in Example I.

Either of these compounds can be converted by thermal polymerization into a final polyamide-imide resin by heating at 275° C. for about 30 minutes or more. The resulting product is a hard material capable of withstanding temperatures of up to about 250° C. (for appreciable lengths of time) without degradation in properties.

EXAMPLE III 4,4′-methylenedianiline and acetic anhydride are reacted under conventional conditions to yield the following compound:

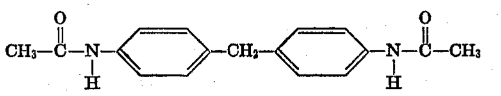

This compound is then reacted with two moles of trimellitic anhydride to form the following dianhydride compound:

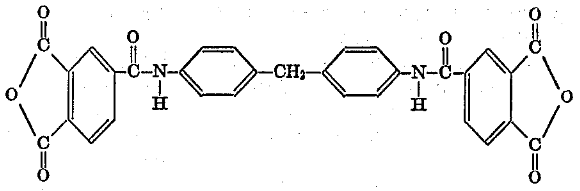

This dianhydride is then reacted with ethylene diamine and nadic anhydride; all reactants being at equivalence. When this reaction is carired out above about 200° C., the following prepolymer compound is formed:

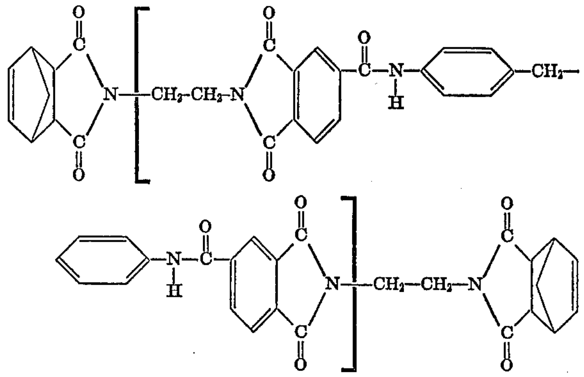

This compound may be recovered as in Example I.

At temperatures below about 200° C., the following corresponding amic-acid precursor compound is formed:

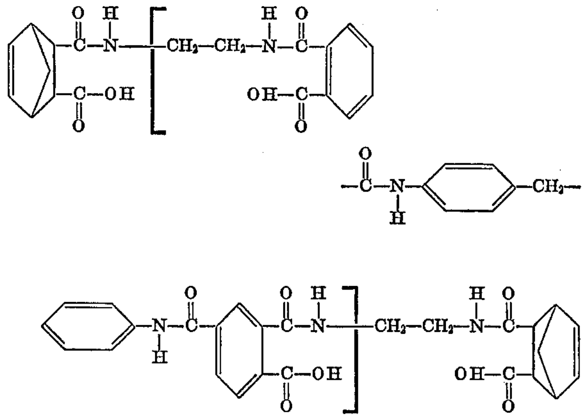

This compound may be recovered as in Example I.

Either of these compounds can be converted by thermal polymerization into a final polyamide-imide resin by heating at 275° C. for about 30 minutes or more. The resulting product is a hard material capable of withstanding temperatures of up to about 250° C. for appreciable lengths of time without degradation in properties.

EXAMPLE IV

All of the reactions of Example I are carried out as in that example with the exception that methyl nadic anhydride is used rather than nadic anhydride. The result is that the prepolymer or precursor of Example I is formed, depending upon reaction temperature, but with the following end groupings:

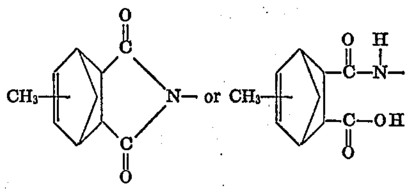

The best mode of adhesive formation and use involves coating the surface of selected adherents with a melt, slurry or varnish of a prepolymer, precursors of the prepolymers or mixtures thereof, and joining the adherents together with heat and pressure.

More specifically, a strong adhesive bond is made by coating a surface of two different types of metal articles with an amic acid solution of the type described above in connection with the best mode of composite formation. The surfaces are brought together and preheated at about 150° C. in a forced air oven for about one hour. Subsequently, the temperature is increased to about 250° C. for an additional hour to complete imidization of the polymer. The bond is then heated at 350° C. and subjected to a pressure of about 200 p.s.i. until a strong bond is formed between the surfaces.

Several important advantages may be obtained by using the present invention in the manner heretofore described. High performance with regard to temperature stability and resistance to oxidation is inherent with the use of these materials. However, this high performance is obtainable at a lower cost than had been believed possible before these present discoveries. In addition, the polymers of this invention possess superior flow and adhesive properties allowing for the preparation of superior laminates, composites, coatings, adhesives and molding compositions.

Whereas the invention has now been particularly described with reference to the preferred embodiments thereof and with further reference to the best presently contemplated mode of making and using, it will be readily apparent to those of ordinary skill in the art that various other adaptations and modifications of the invention are possible without departing from the spirit and scope of the invention as set forth in the appended claims.

For example, whereas the prepolymers, precursors and final polymers have been described in the examples as specific compounds, it will be readily apparent to those skilled in the art that the family of compounds as described hereinabove by way of generic formula may be made and used according to the teachings of this invention. Thus, $Y_1$ through $Y_6$, $Y_7$, $Y_8$, $R_1$, $R_2$, $R_3$ and $n$ may vary within all the limits cited without departing from the invention as their choice is not critical so long as the teachings of the invention are followed.

I claim:

1. A method of joining two solid surfaces comprising the steps of (a) coating at least one of said surfaces with a polymer selected from the group consisting of those polymers represented by the aggregate formula

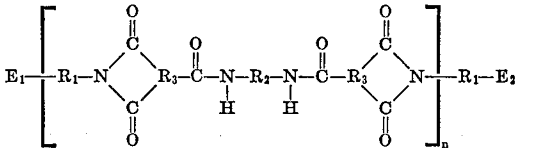

where: $E_1$ and $E_2$ are, for each constituent compound, individually selected from the class consisting of

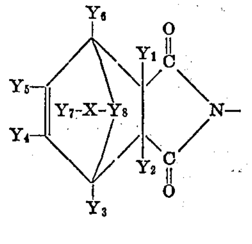

and

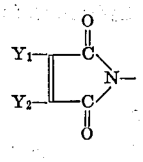

those polymers represented by the aggregate formula

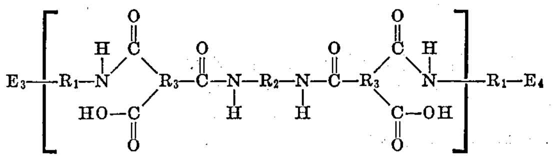

where: $E_3$ and $E_4$, are for each constituent compound, individually selected from the class consisting of

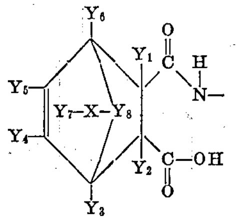

and

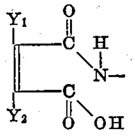

and mixtures thereof;

where: X is a member of the class consisting of carbon, oxygen, sulfur, and carbonyl, $Y_1$ through $Y_6$; and $Y_7$ and $Y_8$ when present, are individually selected rrom the class consisting of hydrogen, aromatic groups, substituted aromatic groups, saturated or unsaturated hydrocarbon groups having from 1 to 6 carbon atoms, alkyl ethers, halogens, and nitro groups;

$R_1$ and $R_2$ are, for each constituent compound, individually selected from the class consisting of aromatic groups, substituted aromatic groups, saturated and unsaturated hydrocarbon groups, saturated and unsaturated heterocyclic groups, and mixtures thereof;

$R_3$ is, for each constituent compound, selected from the class consisting of substituted aromatic groups, unsubstituted aromatic groups, saturated cyclic groups, unsaturated cyclic groups, saturated heterocyclic groups and unsaturated heterocyclic groups; and $n$ is statistically greater than 0 and (b) bringing said surfaces together at a pressure of up to 1,000 p.s.i. and at a temperature above 175° C.

2. The method of claim 1 wherein said pressure is from 200 to 800 p.s.i.

3. The method of claim 1 wherein said temperature is from 175° C. to about 350° C.

4. The method of claim 1 wherein said adhesive composition contains a reinforcing material selected from the group consisting of glass, silicon and graphite.

5. The method of claim 1 wherein $n$ is one or more for a single prepolymer.

References Cited

UNITED STATES PATENTS

| | | | |
|---|---|---|---|
| 3,355,427 | 11/1967 | Loncrini | 260—47 |
| 3,423,431 | 1/1969 | Starr et al. | 260—346.3 |
| 3,435,002 | 3/1969 | Holub | 260—46.5 |
| 3,485,796 | 12/1969 | Naselow | 260—47 |
| 3,528,950 | 9/1970 | Lubowitz | 260—78.4 |
| 3,565,549 | 2/1971 | Lubowitz et al. | 117—126 |
| 3,576,691 | 4/1971 | Meyers | 156—309 |

CHARLES E. VAN HORN, Primary Examiner

R. A. DAWSON, Assistant Examiner

U.S. Cl. X.R.

161—227; 260—30.2, 30.4 N, 32.6 N, 47 CP, 78 TF